United States Patent [19]

Nakadai et al.

[11] Patent Number: 4,995,602
[45] Date of Patent: Feb. 26, 1991

[54] FACSIMILE DEVICE

[75] Inventors: Yoshikazu Nakadai; Daiya Taranishi, both of Atsugi; Koichi Hirokawa, Kawasaki; Nobuki Matsumoto, Miura, all of Japan

[73] Assignee: Ricoh Company, Ltd., Tokyo, Japan

[21] Appl. No.: 483,276

[22] Filed: Feb. 16, 1990

Related U.S. Application Data

[63] Continuation of Ser. No. 216,308, Jul. 8, 1988, abandoned.

[30] Foreign Application Priority Data

Jul. 10, 1987 [JP] Japan ................... 62-171193

[51] Int. Cl.⁵ ........................... B65H 31/24
[52] U.S. Cl. ........................... 271/207; 271/220
[58] Field of Search ............ 271/207, 209, 279, 300, 271/292, 220

[56] References Cited

U.S. PATENT DOCUMENTS 3,154,356 10/1964 Lewis et al. .................. 271/207
3,617,053 11/1971 Menard ........................ 271/207 X
4,345,754 8/1982 Willenbring ................... 271/220 X

FOREIGN PATENT DOCUMENTS 2569669 3/1986 France ...................... 271/209

Primary Examiner—Richard A. Schacher
Attorney, Agent, or Firm—Oblon, Spivak, McClelland, Maier & Neustadt

[57] ABSTRACT

A facsimile device in which both of manuscript and copied sheet are discharged in a direction outside of the front surface at the operating portion of the facsimile device, and a sheet tray assembly unitarily constructed with a manuscript tray for receiving manuscript and a copied sheet tray for receiving copied sheet is attached to the main part of the facsimile device. And further, a partition member is additionally provided therein for use in separating the copied sheet tray and the manuscript tray from each other. Both of the manuscript tray and the copied sheet tray can be jointed to the facsimile device's main part together with the partition member so as to be inclined in a direction substantially perpendicular to that of discharging the copied sheet in the same direction, for instance, in a vertical direction. In such a construction, even curling sheet can be smoothly stacked in the sheet tray assembly.

20 Claims, 7 Drawing Sheets

FIG. 3(a)
FIG. 3(b)
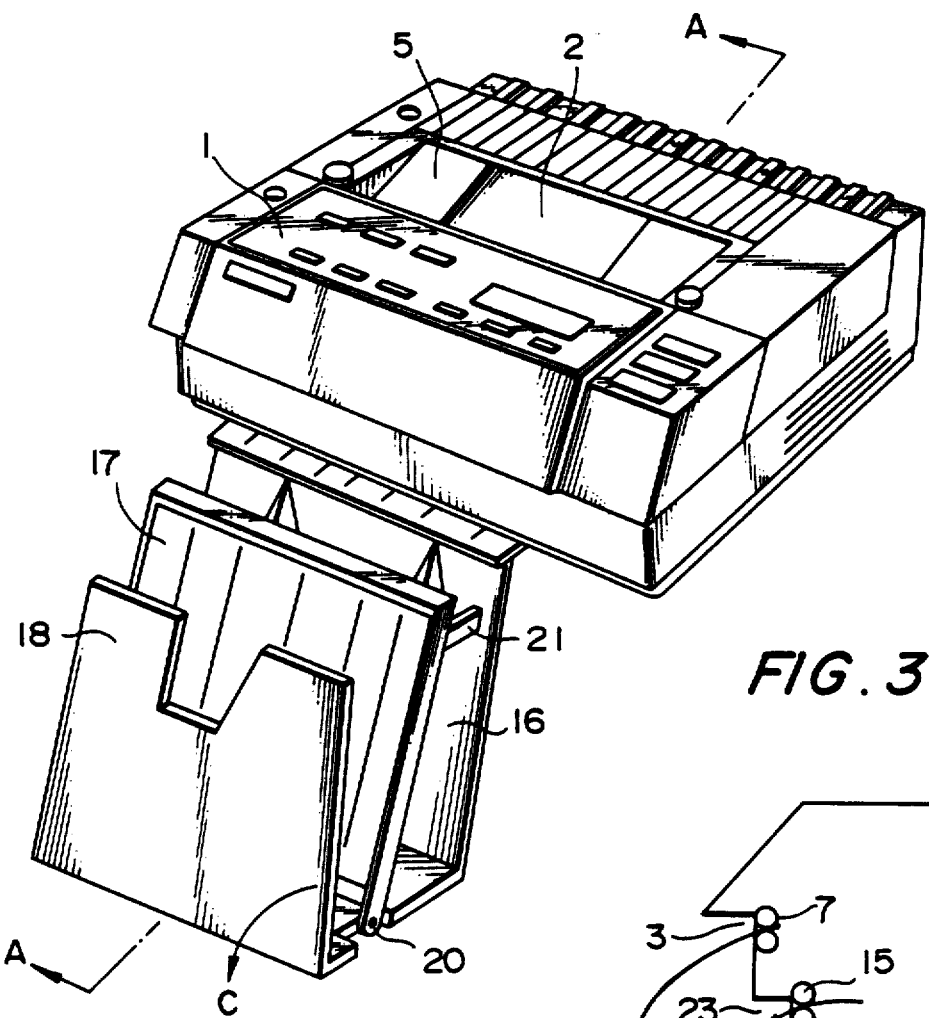
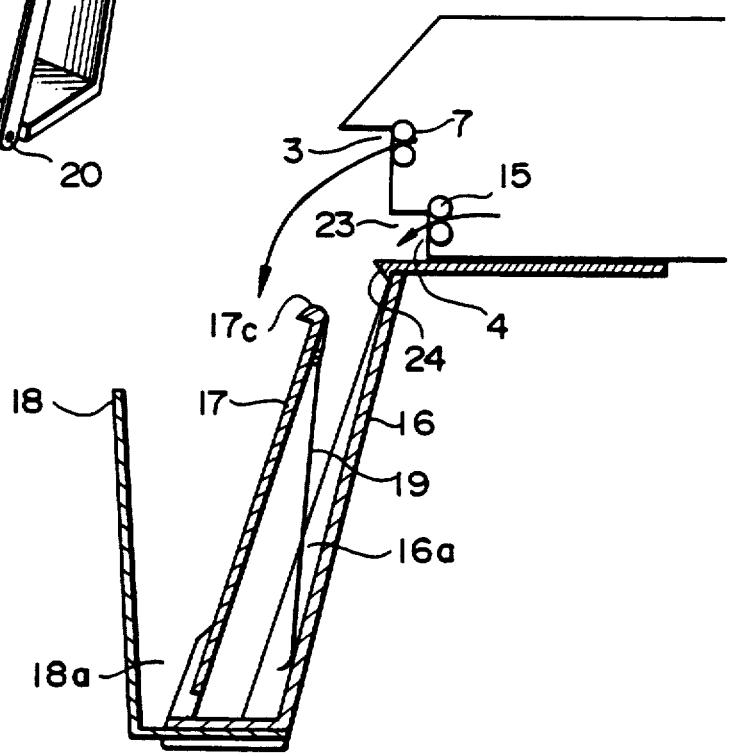

FACSIMILE DEVICE

This application is a continuation of application Ser. No. 216,308, filed on July 8, 1988, now abandoned.

BACKGROUND OF THE INVENTION

1. Field of the Invention

The present invention relates to a facsimile device in which both a manuscript and copied sheet are discharged in a direction outside of the front surface at the operating portion of the facsimile device, in particular, a facsimile device in which a sheet tray assembly unitarily comprising a manuscript tray for receiving manuscript and a copied sheet tray for receiving copied sheet are attached to the main part of the facsimile device, and the same is constructed such that even a curled sheet can be smoothly stacked in the sheet tray assembly.

2. Description of the Prior Art

Conventionally, in a facsimile device in which manuscript and copied sheet are discharged in a direction outside of the front surface at the operating portion of the facsimile device, the main part of the facsimile device is put, for instance, on a table, and a horizontal tray is equipped at the sheet discharging side thereof, or a basket-shaped falling-down tray is equipped at the same.

In the case of the former, if a stocked previous-page copied sheet gets into a habit of curling and thereby turns out to be rolled, the tip end of next subsequent-page copied sheet gets hooked at the previous-page copied sheet, and therefore the same pushes out some of the stacked copied sheets as it exits from the upper part of the tray. Consequently, the copied sheets cannot be stocked (stacked) normally. And further, in the case of the latter, since the basket-shaped falling-down tray has no means for reforming the curled copied sheet, the same enters the tray as it is and turns out to be rolled at the same time. Consequently, stack of the rolled sheets becomes bulky (voluminous), so that many of copied sheets cannot be stocked in a limited space. And further, in the case of stocking both of copied sheet and manuscript in the same tray, the number of stocked sheets is restricted. In addition, the works of classifying copied sheets and manuscripts may get troublesome.

Next, sheet discharging mechanisms of the facsimile device are described in detail. A manuscript putting table is provided at the rear end of an operating portion. Furthermore, a manuscript discharging outlet is provided at the side of the operating portion and a copied sheet discharging outlet is further provided at the lower stage thereof. Moreover, a manuscript's width setting guide means is disposed on the manuscript putting stand.

In the facsimile device having such sheet discharging outlets, when a horizontal tray is installed thereto so as to fit the length (width) of manuscript or copied sheet (for instance, A-size, B-size, etc.), the same protrudes in the forward direction at the front surface side of the operating portion so that the operability of such facsimile device turns out to be worse. Furthermore, also in the case of employing a commonly-used tray for manuscript and copied sheet, since the tray fitted to the length (width) of the sheet is the employed the situation is same in diminished operability. In addition, manuscript and copied sheet mixedly exist and therefore it takes a long time for selecting and putting those mixed sheets in order. As mentioned heretofore, the conventional facsimile device has such defects to be solved.

And further, the operational function of the facsimile device is explained in brief hereinafter. When the manuscript to be transmitted is set on the manuscript putting table, the set position thereof in its width direction is limited by means of the manuscript's width setting guide. The manuscript set by operating the operating portion of the facsimile device is separated from the device on a separating section and transported therefrom by use of a pair of manuscript transporting rollers. The same is read out by the reading-out portion of an optical system constructed with light source, mirror, etc., and an electric signal thus generated is transmitted therefrom. And further, the manuscript read out is transported by use of another pair of manuscript transporting rollers and discharged from the front surface of the facsimile device through the manuscript discharging outlet.

Furthermore, in the case of receive-printing, the recording portion is constructed in such a manner as that the recording medium such as roll paper is printed by the recording portion comprising a thermal head and a platen roller, and the printed recording medium is cut off by a cutter unit and further discharged by use of a discharging roller from the front surface of the facsimile device through the copied sheet discharging outlet.

As mentioned above, in a facsimile device having sheet discharging outlets for respectively discharging manuscript and copied sheet provided at the front surface side of the operating portion, a horizontal tray is attached thereto and therefore the same protrudes at the front surface side of the device so that its operability is remarkably worsened. In such a situation, the device is required to be improved.

Furthermore, in the case of cutting off the rolled paper by the cutter unit and discharging it outside of the device through the copied sheet discharging outlet, the rolled paper tends to be curled in itself. In the conventional device, there remains a problem to be solved that the paper gets rolled up if its tendency of being curled is not removed, namely, the paper lacks firmness so that the copied sheet (paper) cannot be smoothly stacked in the tray normally.

SUMMARY OF THE INVENTION

It is an object of the present invention to improve the above-mentioned operability of the facsimile device.

It is another object of the present invention to provide a discharged paper receiving tray capable of smoothly receiving and stacking the discharged rolled paper (including the generally used recording paper).

Other objects and features of the present invention will be apparent from the following detailed description and claims in accordance with the accompanying drawings.

BRIEF DESCRIPTION OF THE DRAWINGS

FIG. 1 shows an embodiment of the present invention, wherein

FIGS. 2(a) through 2(f) are explanatory views for explaining the operational mechanism of the tray assembly shown in FIG. 1 and the operation thereof, wherein FIG. 2(a) shows the entire tray assembly, FIG. 2(b) a copied sheet tray portion in a bad (undesirable) state of stacking, FIGS. 2(c) and 2(d) show another copied sheet tray portion having a horizontal member, and FIGS. 2(e) and 2(f) show still another copied sheet tray portions having horizontal members, respectively, commonly used for the respective sheet discharging rollers and exclusively used for the specified roller;

FIG. 3 shows another embodiment of the present invention, wherein FIG.3(a) is a perspective view thereof, FIG.3(b) is a cross-sectional view taken along the line A—A of FIG.3(a);

FIGS. 6 and 7 respectively show the structure of prior art facsimile device's main body, wherein FIGS. 6(a) and 7(a) are perspective views thereof and FIGS. 6(b) and 7(b) are, respectively, partial cross-sectional views taken along the line A—A of FIGS. 6(a) and 7(a).

DESCRIPTION OF THE PREFERRED EMBODIMENTS

Figure 4:
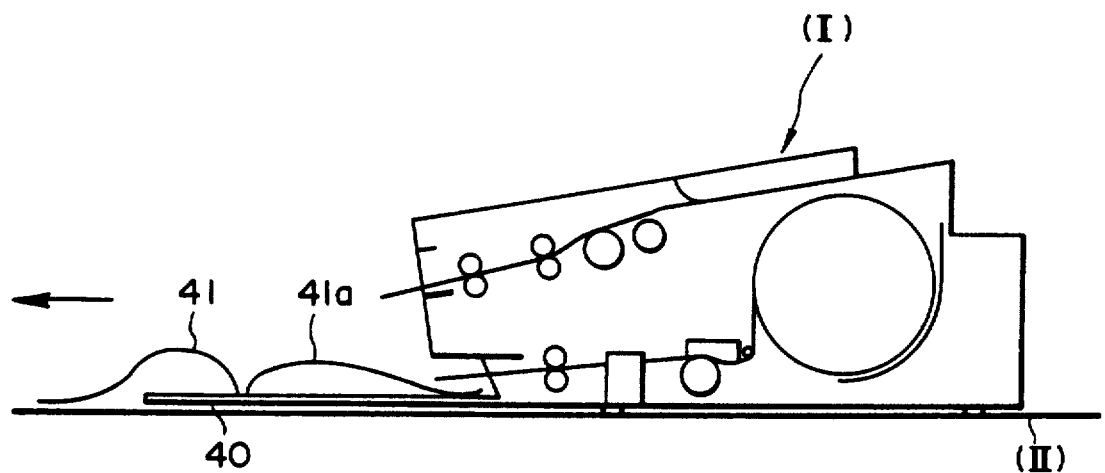
FIGS. 4 and 5 respectively show the structure of paper discharging trays employed in the prior art facsimile device.
Figure 5:
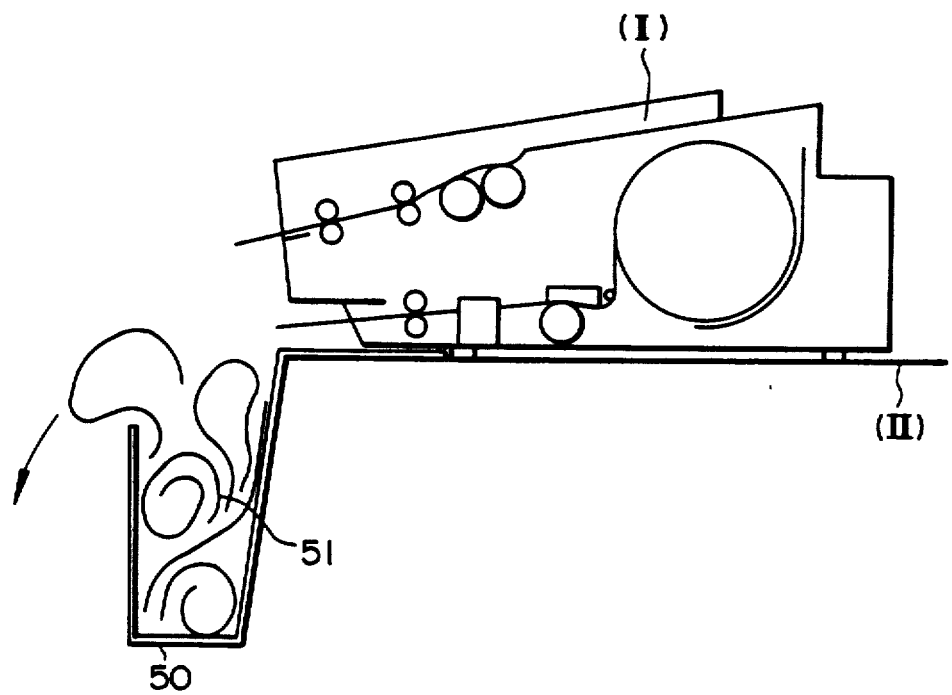

In a facsimile device, the manuscript and copied sheet are discharged in a direction outside of the front surface at the operating portion of the facsimile device. The main part (I) of the conventional facsimile device is put on a table (II), and a horizontal tray 40 is equipped at the sheet discharging side thereof as shown in FIG. 4, or a basket-shaped falling-down tray 50 is so equipped as shown in FIG. 5. In FIG. 4, if stocked previous-page copied sheet 41 gets into a habit of curling and thereby turns out to be rolled, the tip end of next subsequent-page copied sheet 41a gets hooked at the previous-page copied sheet 41, and therefore the same pushes out some of stacked copied sheets as it exits from the upper part of the tray. Consequently, the copied sheets cannot be stocked (stacked) normally. And further, in FIG. 5, since the basket-shaped falling-down tray 50 has no means for reforming the curled copied sheet 51, the same enters the tray 50 as it is and is rolled at the same time.

Figure 6:
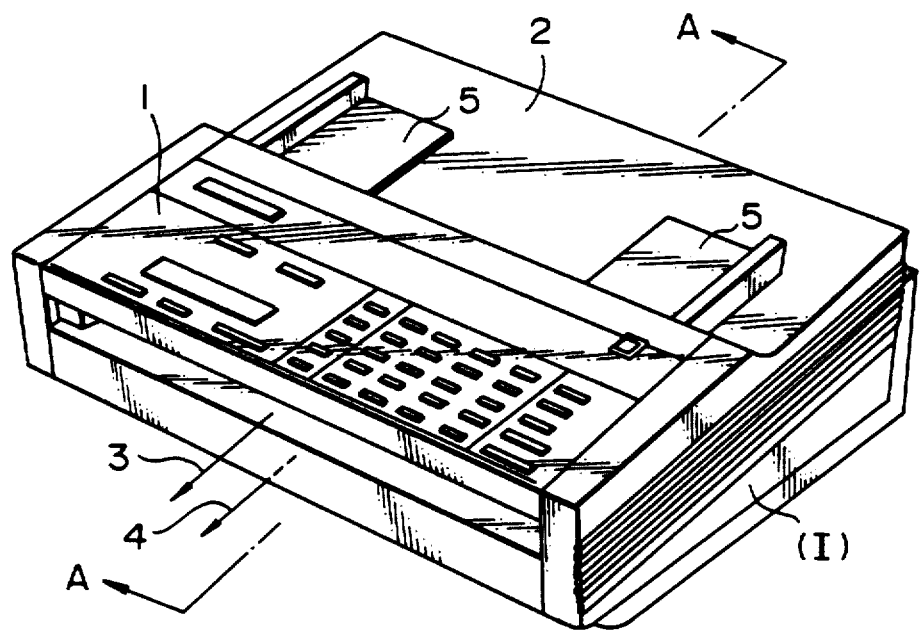
Figure 6:
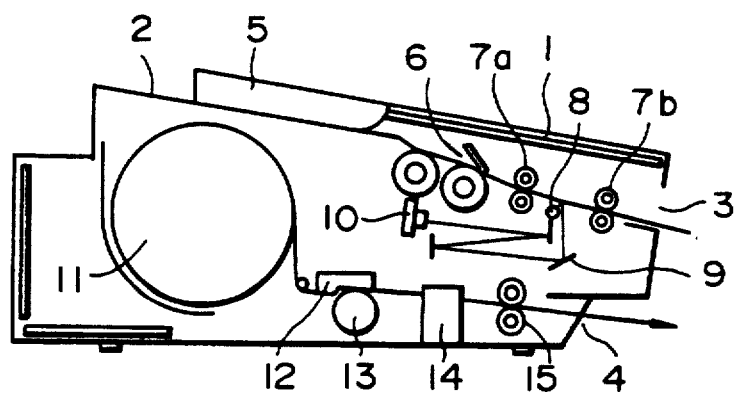
Figure 7:
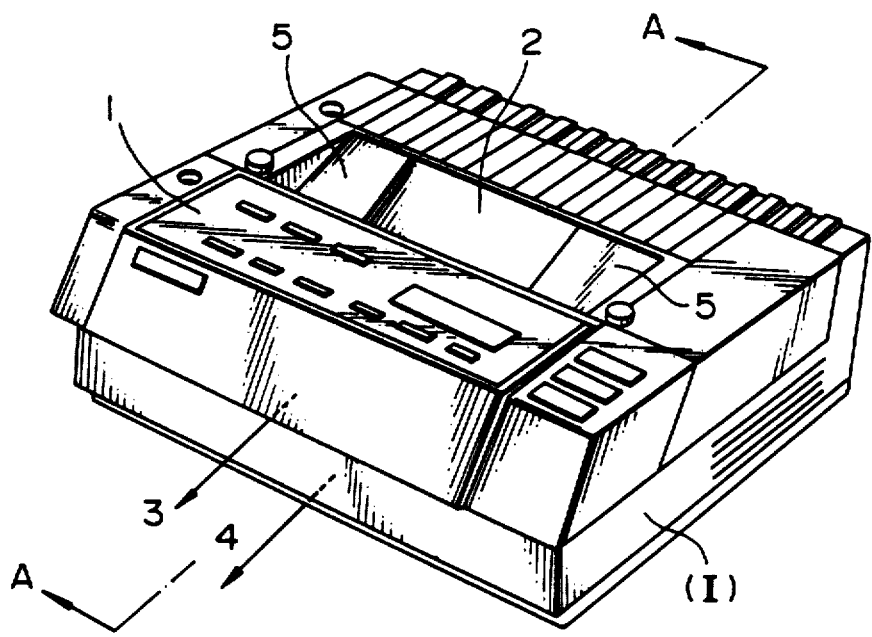
Figure 7:
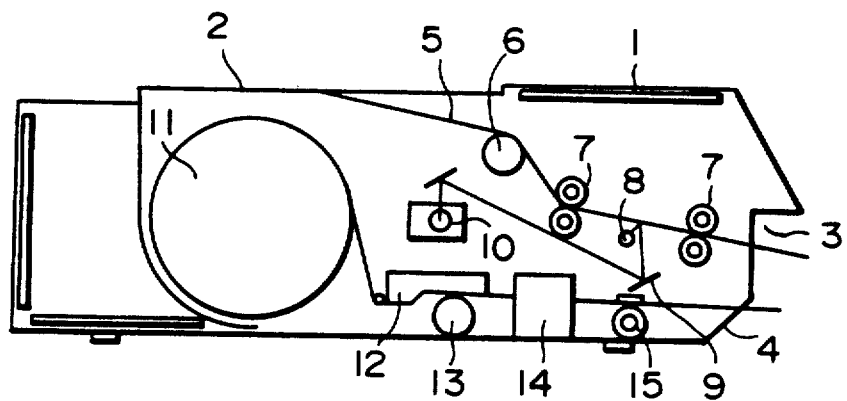

Next, sheet discharging mechanisms of the prior art facsimile device as shown in FIGS. 4 and 5 are described in detail with reference to the constructions shown in FIGS. 6 and 7, respectively. As shown in FIGS. 6 and 7, a manuscript putting table 2 is provided at the rear end of an operating portion 1. Furthermore, a manuscript discharging outlet 3 is provided at the side of the operating portion and a copied sheet discharging outlet 4 is further provided at the lower stage thereof. Moreover, a manuscript's width setting guide means 5 is disposed on the manuscript putting stand 2.

And further, the operational function of the facsimile device is explained in brief hereinafter. When the manuscript to be transmitted is set on the manuscript putting table 2, the set position thereof in its width direction is limited by means of the manuscript's width setting guide 5. The manuscript set by operating the operating portion 1 of the facsimile device is separated from the device on a separating section 6 and transported therefrom by use of a pair of manuscript transporting rollers 7a. The same is read out by the reading-out portion 10 of an optical system constructed with light source 8, mirror 9, etc., and an electric signal generated is transmitted therefrom. And further, the manuscript read out is transported by use of another pair of manuscript transporting rollers 7b and discharged from the front surface of the facsimile device through the manuscript discharging outlet 3.

Furthermore, in the case of receive-printing, the recording portion is constructed such that the recording medium such as roll paper 11 is printed by the recording portion comprising a thermal head 12 and a platen roller 13, and the printed recording medium is cut off by a cutter unit 14, and further discharged by use of a pair of discharging rollers 15 from the front surface of the facsimile device through the copied sheet discharging outlet 4.

In order to attain the objects as mentioned previously, the device according to the present invention is constructed such that, in a facsimile device in which both of manuscript and copied sheet are discharged in a direction outside of the front surface side at the operating portion of said facsimile device's main body, both of the afore-mentioned manuscript tray and copied sheet tray are unitarily formed via a partition member, the manuscript tray can be opened and closed in a forward or backward direction at the front surface side of the facsimile device by means of a hinge so as to connect the copied sheet tray and the partition member with each other. The partition member can be locked to the copied sheet tray, and the manuscript tray and the copied sheet tray can be attached to the facsimile device's main part so as to be inclined perpendicularly to the sheet discharging direction, for instance, vertically.

According to the present invention, a manuscript or copied sheet discharged from the front surface side of the facsimile device's operating portion is exhausted into each tray installed somewhat inclinedly in a perpendicular (vertical) direction. In such a construction, both of the manuscript tray and the copied sheet tray do not protrude at the front surface side of the facsimile device, so that the device can be operated without degrading its operability. Furthermore, the rolled paper can be exhausted smoothly by use of a sheet pressing member and a convex-and-concave portion formed on the inclined surface for preventing the rolled paper from getting rolled up by virtue of curling tendency thereof and further jamming therein.

EMBODIMENTS

Figure 1A:
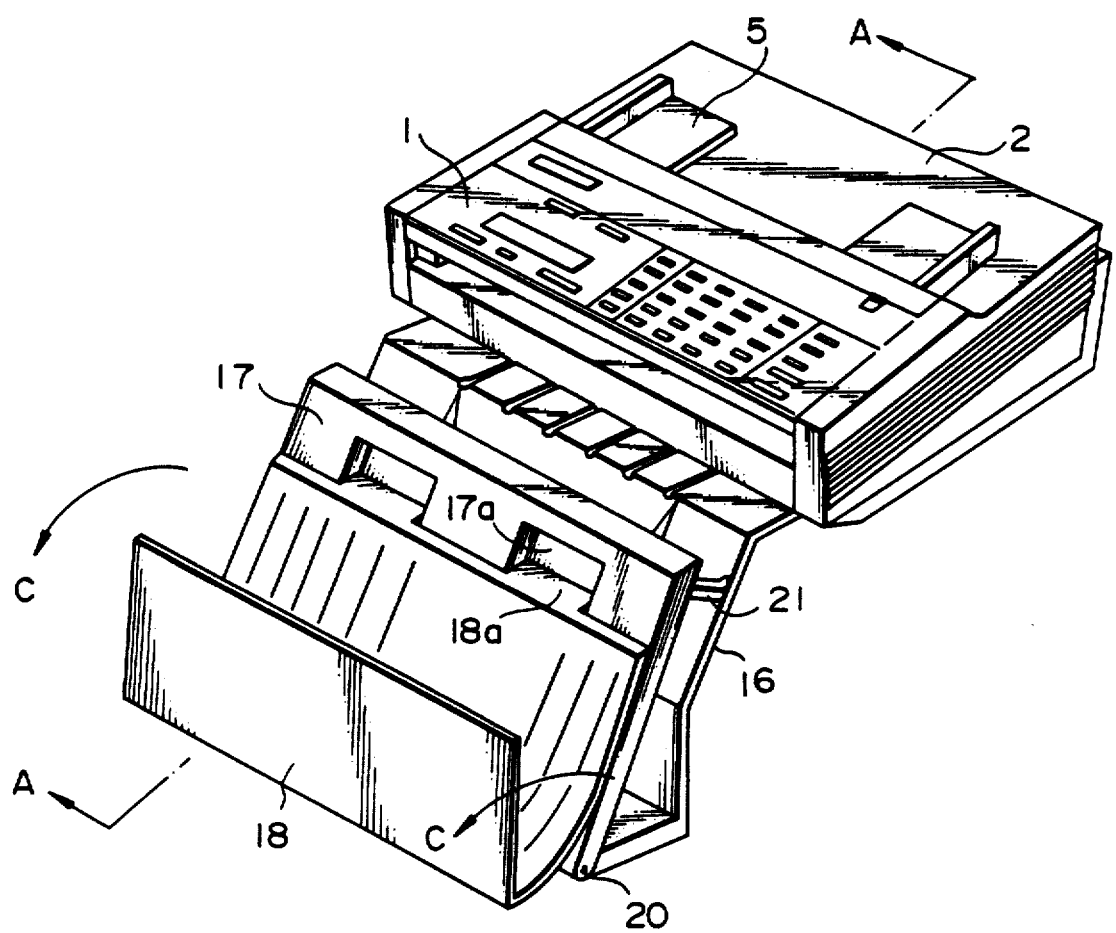
FIG. 1(a) is a perspective view showing a tray assembly constructed with a manuscript tray and a copied sheet tray unitarily combined with each other and attached to the facsimile device's main body.
Figure 1B:
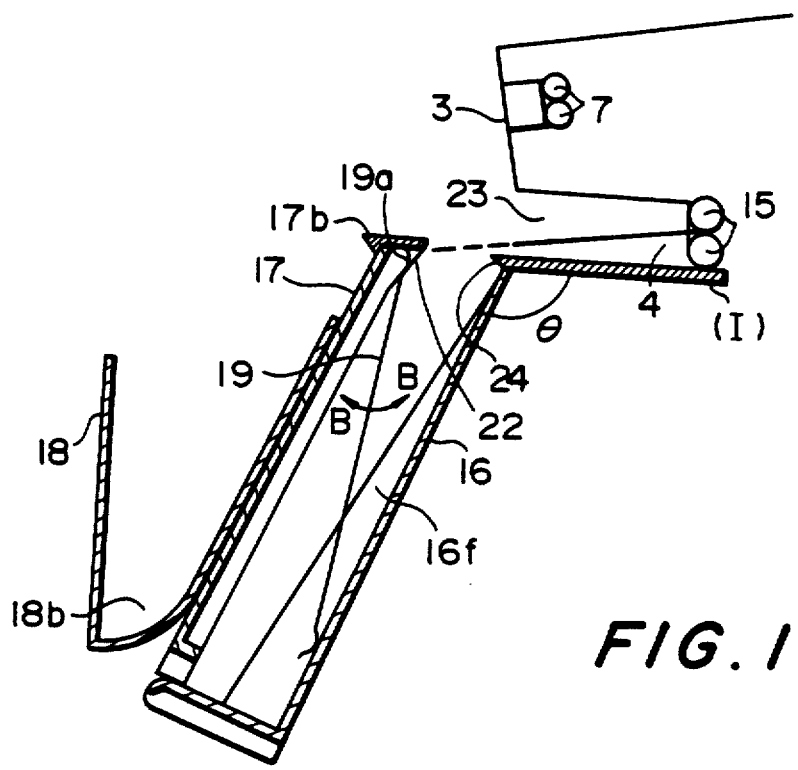
FIG. 1(b) is a partial cross-sectional view taken along the line A—A of FIG. 1(a)
Figure 1C:
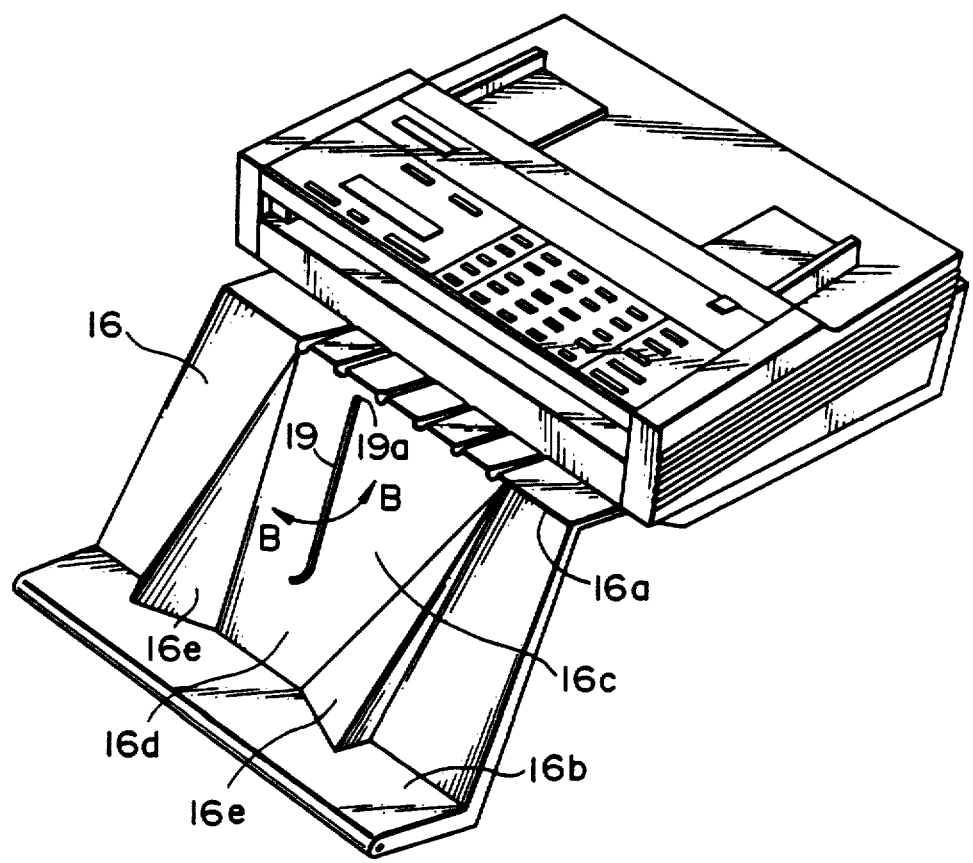
FIG. 1(c) is a perspective view showing the same tray assembly as shown in FIG. 1(a), from which both of the manuscript tray and the partition member installed between the manuscript tray and the copied sheet tray are removed.

FIG. 1 shows an embodiment according to the present invention. FIG. 1(a) is a perspective view showing a tray assembly constructed with a manuscript tray and a copied sheet tray unitarily combined with each other and attached to the facsimile device's main body. FIG. 1(b) is a partial cross-sectional view taken along the line A—A of FIG. 1(a). FIG. 1(c) is a perspective view showing the same tray as shown in FIG. 1(a), from which both of the manuscript tray and the partition member installed between the manuscript tray and the copied sheet tray are removed.

In FIG. 1, the reference numeral 16 represents a copied sheet tray. As shown in FIG. 1(c), a concave portion 16d and convex portions 16e are formed in a direction of discharging paper sheet along an inclined surface 16c extending over an area from a top portion 16a to a bottom portion 16b. Those concave and convex portions are formed in order to apply copied sheet firmness for preventing the rolled paper from being curled. In the embodiment as shown in FIG. 1(c), the right and left convex portions 16e are formed in a shape of fan such that both of the convex portions have a copied sheet receiving surface becoming gradually larger (wider) from the top portion 16a to the bottom portion 16b. Furthermore, although the arrangement width (distance) of the right and left convex portions 16e is predetermined to a value smaller (narrower) than the width of the rolled paper, its arrangement width may be allowed to be changed in accordance with the width of the rolled paper. And further, as shown in FIG. 1(b), the reference numeral 16f represents a copied sheet stacking portion. The reference numeral 17 represents a partition member for use in separating the copied sheet tray and the manuscript tray from each other. The member 17 further forms an external side plate of the copied sheet tray and the same is provided with engagement windows 17a at right and left for the purpose of installing the tray thereto. The reference numeral 18 represents a manuscript tray having engaging portions 18a which is engaged with an engaging window 17a of the afore-mentioned partition member 17 for unitarily combining them with each other. And further, 18b is a (manuscript) stacking portion having a fan-shaped cross-section.

In FIG. 1(b), 19 is a copied sheet pressing member and the member 19 is installed such that it can be rotatably moved freely in a forward-and-backward direction B—B around a fulcrum, that is, a fixed point 19a in the neighborhood of a copied sheet guiding surface 22 shown in FIG. 1(b) and described later. [Refer to FIG. 1(b).] The reference numeral 20 represents a hinge shown in FIG. 3(a). The hinge 20 is installed such that the external end at the bottom portion 16b of the copied sheet tray 16 and the bottom end of the partition member 17 are connected with each other. In such a construction, the manuscript tray 18 can be opened and closed in a direction shown by an arrow C unitarily together with the partition member, for the purpose of facilitating the work of taking out copied sheets from the copied sheet tray situated deep in the innermost recess of the manuscript tray.

The reference numeral 21 represents a lock mechanism. The mechanisms 21 are attached to the right and left end portions of the copied sheet tray 16 in order to lock the partition member 17 to the copied sheet tray. The reference numeral 22 represents a copied sheet guiding surface of the partition member 17. A visor-shaped projecting member 17b is formed at the side of the copied sheet tray's copied sheet stacking portion 16f. The member 17b is situated on a position elongated along the extended line in a direction of discharging the copied sheet and the same guides copied sheets to the copied sheet tray 16. The reference numeral 23 represents an overflow opening portion. When a copied sheet is discharged from the sheet discharging roller 15 of the facsimile device's main body in a state of being rolled up or a long-sized copied sheet is discharged therefrom, the discharged copied sheet tends to overflow and to be jammed. An opening space is provided in the area above the extended line in a direction of discharging the copied sheet starting from the copied sheet discharging roller 15. The reference numeral 24 represents a visor shaped member, i.e., "visor", formed at the copied sheet stacking side on the upper end portion of the copied sheet tray 16. The rear end of the rolled paper cut off is put into the space formed by the visor 24. Consequently, the subsequent rolled paper can be discharged without any hindrance. And further, another visor 17b carries out the same function as mentioned above in relation to the manuscript tray 18.

The functional operation of the embodiment constructed in such a way as mentioned above is described in detail hereinafter. The copied sheet is discharged from the copied sheet discharging outlet 4 by means of the sheet discharging rollers 15 of the facsimile device's main body, and the same is sent out to the copied sheet tray side 16. Since the copied sheet tray 16 has an installment angle $\theta$ capable of enabling the copied sheet to fall down, the copied sheet normally falls down when it arrives at the tray 16. On this occasion, the copied sheet is applied with firmness and discharged by the sheet discharging roller 15. When the front tip end of the firmness-applied copied sheet hits against the copied sheet guiding surface 22, the copied sheet loses its firmness and the same is guided into the copied sheet stacking portion 16f in a state of curving because of its curling tendency. When the copied sheet is guided into the stacking portion 16f, the copied sheet pressing member 19 attached to a place in the neighborhood of the copied sheet guiding surface 22 and the concave and convex portions 16d and 16e formed on the inclined surface 16c apply firmness to the copied sheet which is stacked in the sheet stacking portion 16f. When the copied sheet is stacked therein, the visor 24 overlies the rear end of the stocked copied sheet therein. Therefore, the front tip end of the next newly discharged copied sheet doesn't fall on the rear end of the already stocked copied sheet, so that the newly discharged sheet is smoothly transported into the tray 16. And further, when the manuscript tray 18 is set to the partition member 17, the operator can turn the tray 18 in the forward direction C as shown in FIG. 1(a) by virtue of the hinge 20 and easily take out the copied sheets stocked in the copied sheet tray situated deep in the interior of the manuscript tray.

Next, the manuscript is discharged from the manuscript discharging outlet 3 by the manuscript transporting roller 7 of the facsimile device's main body, and the same is stacked in the stacking portion 18b of the manuscript tray 18 in an installation angle $\theta$ coinciding with the angle in the sheet discharging angle. [Refer to FIG. 1(b).]

Moreover, in case that the manuscript tends to be curled according to the nature of the manuscript sheet, a curl preventing mechanism may be attached thereto as is the case for the copied sheet tray 16.

Concerning the construction of the present embodiment, the afore-mentioned copied sheet pressing member 19 can be rotatably moved around a fulcrum, that is, a reference (cardinal) point 19a in a forward-and-backward direction. A bar-like member as shown in FIG.1(c), or a narrow-width plate member, or an elastic member having a smoothly-leveled surface may be allowed to be used as a member for applying firmness to the copied sheets. And further, the copied sheet pressing member provided in the central area of tray's inclined surface is narrower than the width of the rolled paper as shown in FIG.1(c). Otherwise, if a plurality of copied sheet pressing members are provided therein, the effect of applying firmness to the copied sheet may be increasingly raised. Furthermore, when the copied sheet tray installing inclination is set at a sharp (or acute) angle or even at an angle of 90°, namely, the copied sheet tray 16 is set in a state of being approximately perpendicular to the direction of discharging the copied sheet (for instance, in a state of being vertical thereto), the effect of pressing the copied sheets by use of the pressing member 19 may be raised. On the contrary, when the installing inclination of the copied sheet tray is set at an obtuse (not sharp), it will be possible to apply firmness to the copied sheet only by means of the concave and convex portions formed on the tray's inclined surface and even to omit the pressing member.

Figure 2A:
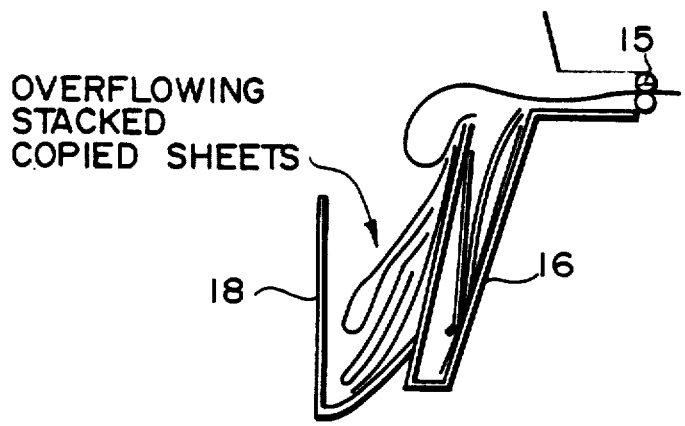

And further, if the direction of exhausting the copied sheet approximately coincides with the vertical direction, it may be possible that, the copied sheet guiding surface 22 is omitted, and the copied sheet pressing member 19 is provided on a position elongated almost along the extended line such that the member 19 functions as a sheet guiding surface. When the copied sheet tray 16 is completely filled with the copied sheets, the overflowing copied sheets can be stocked in the manuscript tray 18 by virtue of the copied sheet pressing member 19 as shown in FIG. 2(a).

TABLE 1

(Copied Sheet Size Table)

| Manuscript | Size (Length) of Copied Sheet | |
|---|---|---|
| | A-Roll | B-Roll |
| A3 Size | 300 | 355.4* |
| B4 Size | 308.8 | 365* |
| Legal Size | 355.6 | 355.6* |
| A4 Size | 296 | 296 |
| Letter Size | 279.4 | 279.4 |
| B5-or-less Size | less than 256 | less than 256 |

Figure 2B:
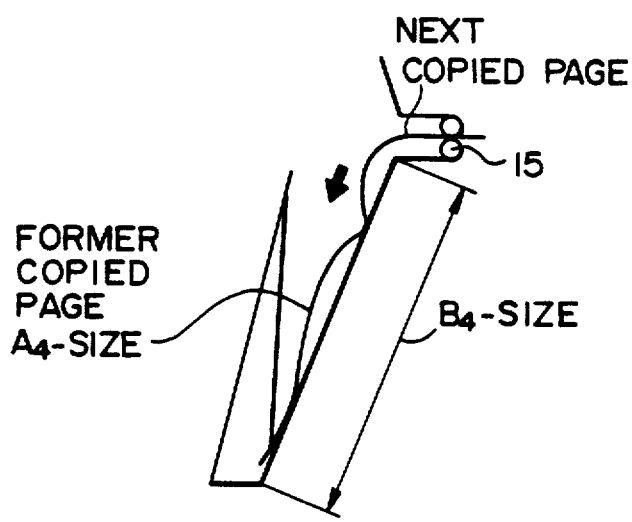

Next, a method of stacking the copied sheets of various different lengths is described hereinafter. An example of the discharged copied sheet's sizes (lengths) are shown in table 1 (Copied Sheet Size Table). Viewing at the copied sheet's lengths of A roll and B roll generally, it will be possible to roughly classify (divide) the copied sheets into two categories, those are, a group of A4 size (296 mm) or near-A4 size and another group of B4 size (365 mm) or near-B4 size (attached a mark "*" in the table 1). In the case of employing an inclined falling-down tray as shown in the embodiment of the present invention (FIGS. 1 and 2), the front tip end of the copied sheets is situated on a uniform level at the lowermost portion of the copied sheet tray 16 and thereby the rear end of the copied sheets turns out to be uneven in the level. Consequently, in the case of stacking the copied sheet of B4 size or near-B4 size only by the action of falling-down, when the copied sheet of A4 size is stacked instead of that of B4 size or near-B4 size, the front tip end of the next-page copied sheet interferes with the rear end of the preceding-page copied sheet and the next-page copied sheet is transported in a direction of being apt to get rolled-up as shown in FIG. 2(b). Therefore, the stackability thereof isn't so good.

Although the manuscript tray, etc. is exchanged for the other one in accordance with the size of sheet in the past, in the case of employing the copied sheet tray the exchanging of the tray performed by human power operation is meaningless, because the operator cannot judge when the message is received and which size (length) of the copied sheet should be prepared for receiving the message.

Figure 2C:
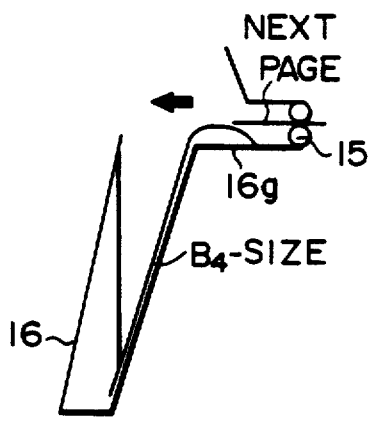
Figure 2D:
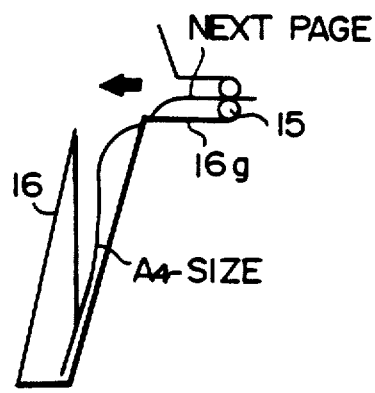

In consideration of the above-mentioned situation, the copied sheet of A4 size(296 mm) or near-A4 size is stacked at the falling-down portion, and concerning the copied sheet of B4 size (365 mm) or near-B4 size, a junction means includes horizontal or approximately horizontal member 16g as shown in FIGS. 2(c) and 2(d) is put in a space between the falling-down portion and the sheet discharging roller located at the copied sheet discharging outlet of the main part and the copied sheet of B4 size or near-B4 size is stacked thereon utilizing the empty weight of the rolled paper and its curing trend. For instance, in the case of employing the copied sheet of B4 size or near-B4 size, the rear end of the preceding-page copied sheet is curled as shown in FIG.2(c). However, the next-page copied sheet is discharged such that firmness is applied to the copied sheet. Therefore, the copied sheets can be stacked in order without any interference between the rear end of the preceding-page copied sheet and the front tip end of the next-page copied sheet. And further, in the case of employing the copied sheet of A4 size or near-A4 size, the next-page copied sheet is transported in such a direction that the front tip end of the next-page copied sheet doesn't interfere with the rear end of the preceding-page copied sheet, so that the copied sheets can be smoothly stacked in the copied sheet tray in order.

Figure 2E:
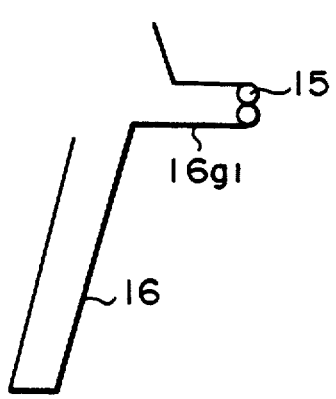
Figure 2F:
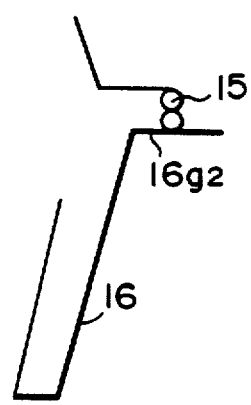

FIGS. 2(e) and 2(f) show, respectively, modifications of the copied sheet tray 16 having the horizontal member 16g shown in FIGS. 2(c) and 2(d), those are, a copied sheet tray having a horizontal member 16g1 shown in FIG.2(e) which is commonly used for the A-roll and the B-roll both shown in the copied sheet size table and another copied sheet tray having a horizontal member 16g2 shown in FIG.2(f) which is exclusively used for the A-roll. The length of the horizontal member 16g2 can be shortened in the latter case, and therefore, operability of the front surface side may be improved by virtue of its size reduction.

FIG.3 shows another embodiment of the present invention. FIG.3(a) is a perspective view thereof. FIG.3(b) is a partial cross-sectional view taken along the section line A—A of FIG.3(a). Same reference numeral as that of FIG.1 shows same thing identically functioning. In the embodiment of the present invention, the partition member 17 and the copied sheet tray 18 are combined with the manuscript tray 16 by means of the hinge 20 fitted up at the lower end portions of both members such that the manuscript tray 18 and the partition member 17 can be rotatably moved in a direction shown by an arrow C in order to open and close the manuscript tray 18. Namely, this embodiment adopts a construction in which both of the engagement windows 17a of the partition member 17 and the engagement portions 18a of the manuscript tray 18 are omitted. Other functioning mechanism is quite same as that of FIG.1. So, the explanation thereof is omitted here.

As is apparent from the foregoing description, according to the present invention, the copied sheet tray and the manuscript tray are both inclinedly set up (installed) to the facsimile device's main body at an installment angle such that both of the trays can fall down in a direction perpendicular to the sheet discharged therefrom (namely, vertically), and therefore the extent of tray's projection at the front side thereof is reduced. In such a way, it may be possible to remarkably improve operability of the operating portion. Furthermore, the copied sheet tray is provided with the convex and concave portions (uneven surface) on the inclined surface thereof, and the same is provided with the copied sheet pressing member at the side of the partition member.

In such a construction, a trend of copied sheet's curling is considerably removed and thereby firmness is applied thereto in order to enable the copied sheet to be easily stacked. And further, the copied sheet is provided with the copied sheet guiding surface, the visor, and the horizontal member. Consequently, the interference between the preceding-page copied sheet and the subsequent-page copied sheet is removed so that the stacking of copied sheets can be smoothly done.

Obviously, various additional modifications and variations of the present invention will become possible for those skilled in the art after receiving the teachings of the present disclosure without departing from the scope thereof.

What is claimed is:

1. A facsimile device in which both a manuscript and a copied sheet are discharged in a direction outside of a front surface side at an operating portion of a main part of said facsimile device,
said facsimile device comprising:
   (a) said main part of said facsimile device,
   (b) a copied sheet tray for receiving a copied sheet,
   (c) a manuscript tray for receiving a manuscript,
   (d) a partition member positioned for separating said copied sheet tray and said manuscript tray from each other,
   (e) connection means for unitarily combining bottom portions of said copied sheet tray and said manuscript tray to form a tray assembly, and
   (f) junction means for jointing said tray assembly to said facsimile device main part,
   wherein both of said manuscript tray and said copied sheet tray are joined to said facsimile device main part together with said partition member so as to be inclined in a substantially vertical direction which is substantially perpendicular to a direction of discharging said copied sheet and wherein said partition member comprises a single member connected with the unitarily combined bottom portions of said copied sheet tray and said manuscript tray, and is commonly usable for both said copied sheet tray and said manuscript tray.

2. A facsimile device as defined in claim 1, wherein said junction means comprises a horizontal portion insertingly set under said facsimile device main part.

3. A facsimile device as defined in claim 1, including a guide surface for guiding said copied sheet and provided at a position elongated in a direction of discharging said copied sheet at a copied sheet stacking portion of said partition member.

4. A facsimile device as defined in claim 1, wherein said copied sheet tray is set at an angle enabling said copied sheet to smoothly fall downward, and wherein a top portion of said copied sheet tray has a visor-like shape.

5. A facsimile device as defined in claim 1, which a top portion at the manuscript tray side of said partition member has a visor like shape.

6. A facsimile device as defined in claim 1, in which a substantially horizontal member is provided in a space between a falling-down portion of said copied sheet tray and an opening for discharging said copied sheet formed in said facsimile device main part.

7. A facsimile device as defined in claim 1, in which an overflow opening portion is provided in an area between a front edge of a copied sheet discharging roller and an upper space in a direction of discharging said copied sheet.

8. A facsimile device as claimed in claim 1 including a lock mechanism comprising means for locking said partition member.

9. A facsimile device as claimed in claim 8 wherein said locking member is positioned in a space between said partition member and said copied sheet tray.

10. The facsimile device as defined in claim 1 wherein said connection means comprises a hinge connecting a lower end portion of said manuscript tray with at least one of said copied sheet tray and said partition member.

11. The facsimile device as claimed in claim 10 wherein said manuscript tray can be rotatably opened and closed around a fulcrum created by said hinge in forward and backward directions at the front surface side of said facsimile device main part by means of said hinge.

12. A facsimile device in which both a manuscript and a copied sheet are discharged in a direction outside of a front surface side at an operation portion of a main part of said facsimile device, said facsimile device comprising:
   (a) said main part of said facsimile device,
   (b) a copied sheet tray for receiving a copied sheet,
   (c) a manuscript tray for receiving a manuscript,
   (d) a partition member positioned separating said copied sheet tray and said manuscript tray from each other,
   (e) connection means for connecting said partition member with one of said copied sheet tray and said manuscript tray, and to form a tray assembly,
   (f) junction means for jointing said tray assembly to said facsimile device main part,
   wherein both of said manuscript tray and said copied sheet tray are joined to said facsimile device main part together with said partition member so as to be inclined in a substantially vertical direction which is substantially perpendicular to a direction of discharging said copied sheet, wherein said partition member can be rotatably moved around a fulcrum created by said connection means in the forward and backward directions at a front surface side of said facsimile device main part by means of said connection means provided so as to connect a lower portion of said copied sheet tray with a lower portion of said partition member, whereby an opening for said copied sheet tray may be made large upon the rotation of said partition member.

13. A facsimile device as defined in claim 12, in which said connection means is a hinge.

14. A facsimile device as defined in claim 12, wherein said junction means comprises a horizontal portion insertingly set under said facsimile device main part.

15. A facsimile device as defined in claim 12, including a guide surface for guiding said copied sheet and provided at a position elongated in a direction of discharging said copied sheet at copied sheet stacking portion of said partition member.

16. A facsimile device as defined in claim 12, wherein said copied sheet tray is set at an angle enabling said copied sheet to smoothly fall downward, and wherein a top portion of said copied sheet tray has a visor-like shape.

17. A facsimile device as defined in claim 12, wherein a top portion at the manuscript tray side of said partition member has a visor-like shape.

18. A facsimile device as defined in claim 12, in which a substantially horizontal member is provided in a space between a falling-down portion of said copied sheet tray and an opening for discharging said copied sheet formed in said facsimile device main part.

19. A facsimile device as defined in claim 12, in which an overflow opening portion is provided in an area between a front edge of a copied sheet discharging roller and an upper space in a direction of discharging said copied sheet.

20. A facsimile device in which both a manuscript and a copied sheet are discharged in a direction outside of a front surface side at an operating portion of a main part of said facsimile device, said facsimile device comprising:
  (a) said main part of said facsimile device,
  (b) a copied sheet tray for receiving a copied sheet,
  (c) a manuscript tray for receiving a manuscript,
  (d) a partition member positioned for separating said copied sheet tray and said manuscript tray from each other,
  (e) connection means for connecting said partition member with one of said copied sheet tray and said manuscript tray to form a tray assembly, and
  (f) junction means for jointing said tray assembly to said facsimile device main part, wherein both of said manuscript tray and said copied sheet tray are joined to said facsimile device main part together with said partition member so as to be inclined in a substantially vertical direction which is substantially perpendicular to a direction of discharging said copied sheet and wherein said partition member comprises a single member commonly usable for both said copied sheet tray and said manuscript tray, wherein said connection means for unitarily connecting said copied sheet tray, said manuscript tray and said partition member with each other comprises:
  (g) an engagement means for engaging said manuscript tray with said partition member by tightly inserting the former into the later, and
  (h) a hinge provided between said copied sheet tray and said partition member, wherein said copied sheet tray can be opened and closed in the forward and backward directions at the front surface side of said facsimile device main part, and said partition member can be locked to said copied sheet tray by use of a lock mechanism.

* * * * *

UNITED STATES PATENT AND TRADEMARK OFFICE
CERTIFICATE OF CORRECTION

PATENT NO. : 4,995,602
DATED : February 26, 1991
INVENTOR(S) : Yoshikazu Nakadai et al.

It is certified that error appears in the above-identified patent and that said Letters Patent is hereby corrected as shown below:

ON TITLE PAGE:

The 2nd inventor's name is spelled incorrectly, please delete, "Daiya Taranishi" and insert, --Daiya Teranishi--.

Signed and Sealed this

First Day of September, 1992

*Attest:*

DOUGLAS B. COMER

*Attesting Officer*  Acting Commissioner of Patents and Trademarks